UNITED STATES PATENT OFFICE.

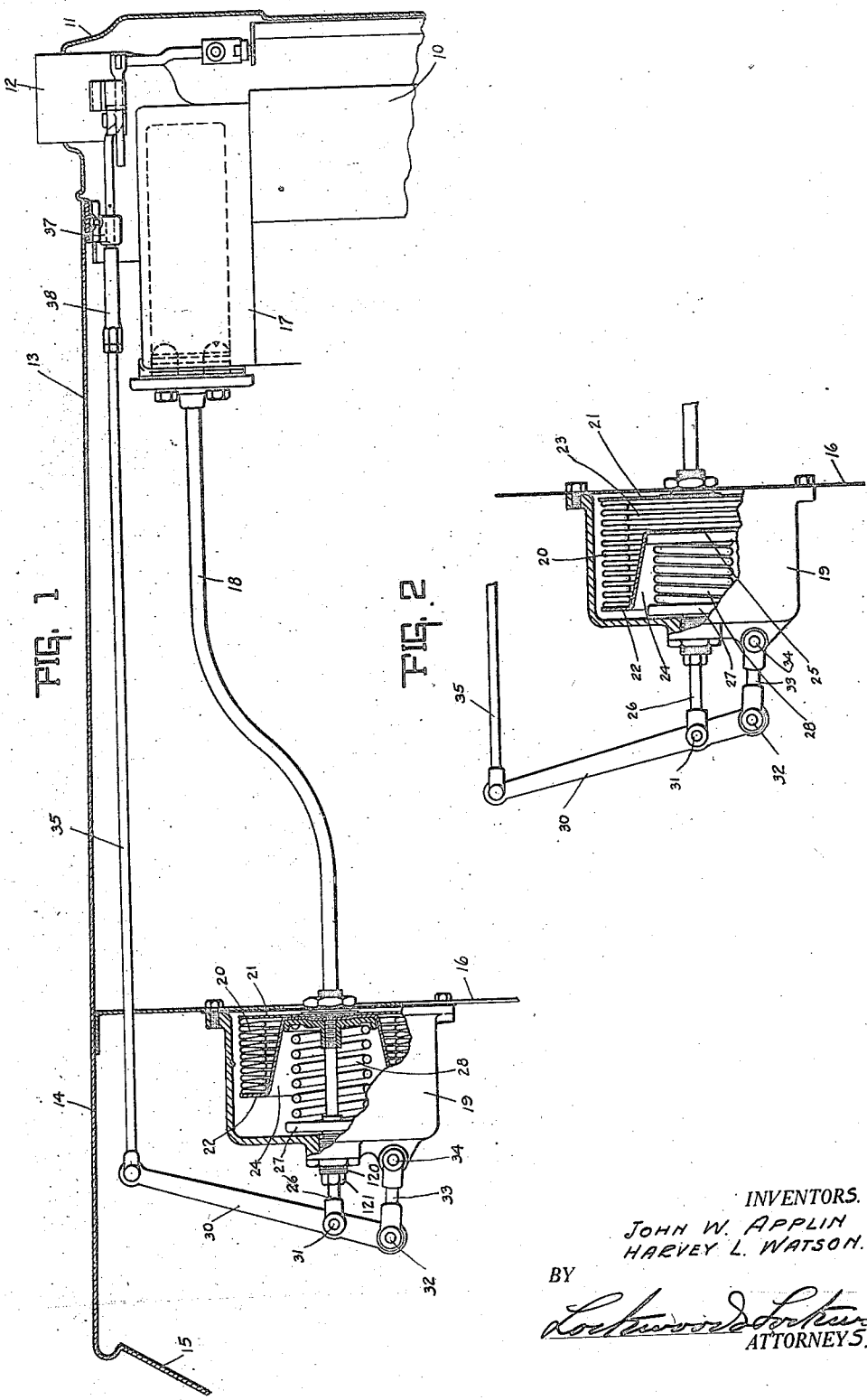

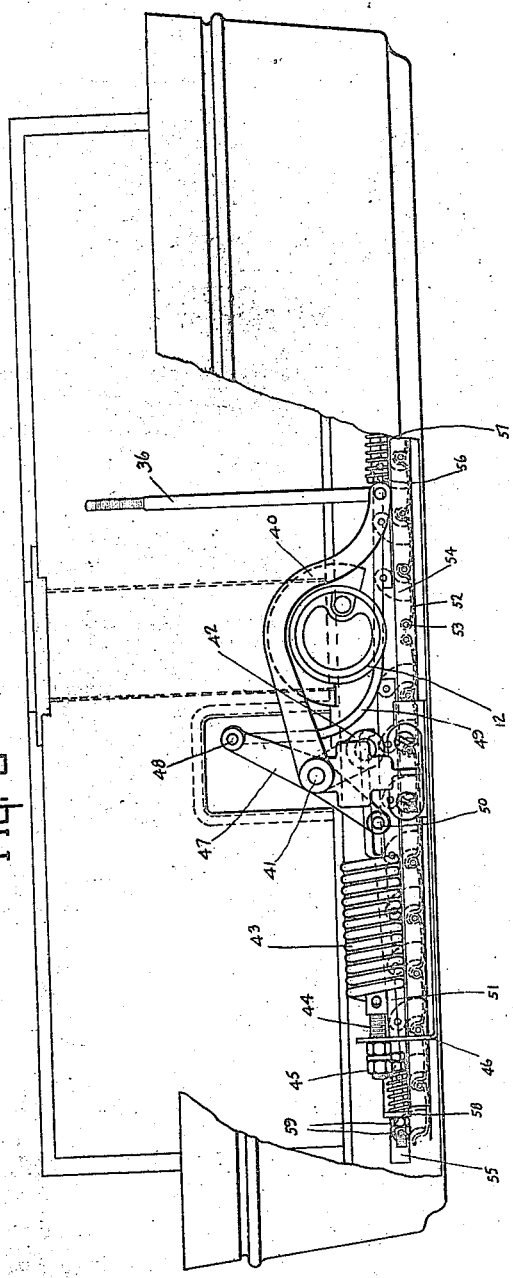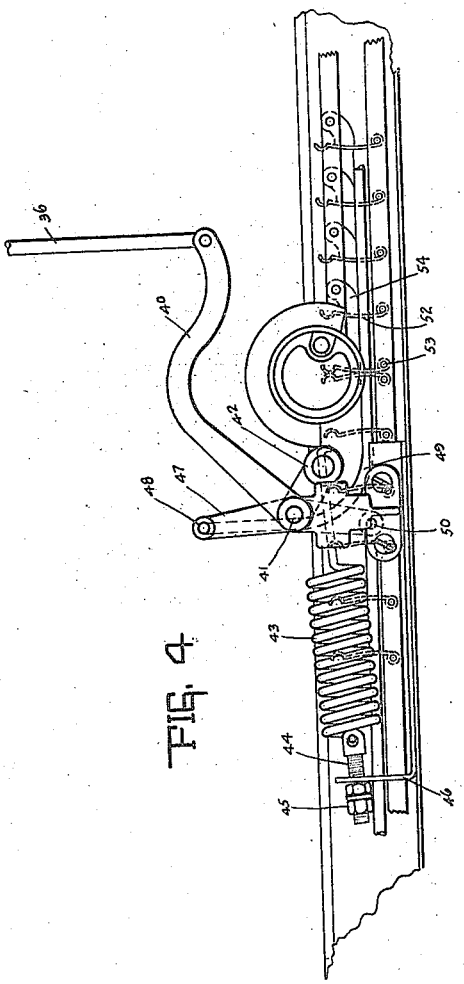

JOHN W. APPLIN AND HARVEY L. WATSON, OF INDIANAPOLIS, INDIANA, ASSIGNORS TO LA FAYETTE MOTORS COMPANY, OF INDIANAPOLIS, INDIANA.

SHUTTER CONTROL FOR VEHICLES.

1,412,822.   Specification of Letters Patent.   Patented Apr. 18, 1922.

Application filed July 26, 1920. Serial No. 398,922.

*To all whom it may concern:*

Be it known that we, JOHN W. APPLIN and HARVEY L. WATSON, citizens of the United States, and residents of Indianapolis, county of Marion, and State of Indiana, have invented a certain new and useful Shutter Control for Vehicles; and we do hereby declare that the following is a full, clear, and exact description thereof, reference being had to the accompanying drawings, in which like numerals refer to like parts.

This invention relates to automatic means for regulating shutter means associated with the radiator of a water cooling system for internal combustion engines.

The chief object of the invention is to provide a controlling mechanism for the shutter construction whereby the same will be actuated by thermal operated means associated with the cooling system so that the temperature of the cooling system may be automatically maintained at any predetermined temperature.

The chief feature of the invention consists in adapting a thermally operated means controlled by the temperature of the water cooling system, a shutter construction associated with the radiator of the water cooling system, and positioning the actuating or power means connected with the shutter within the cowl portion of the motor vehicle.

Another feature of the invention is in the specific means for controlling the shutter, whereby the same is automatically operated to the desired degree.

Another feature of the invention consists in associating with the specific shutter actuating means, suitable means for maintaining the shutters in closed position during such times as the temperature of the cooling liquid falls below the predetermined cooling temperature.

A still further feature of the invention consists in the means for adjusting the temperature at which the thermal means becomes operative to regulate the shutters.

The full nature of this invention will be understood from the accompanying drawings and the following description and claims.

In the drawings Fig. 1 is a diagrammatic elevational view of the forward portion of the motor vehicle including the cowl, hood, radiator, shutters and controlling mechanism associated therewith. Fig. 2 is a similar view of the motor vehicle and actuating means showing the parts in the position when the radiator shutters are in open position, while Fig. 1 illustrates the same parts in the closed position. Fig. 3 is a top plan view of the shutter actuating means associated with the motor means, parts being broken away to show other parts in detail. The parts in Fig. 3 are shown in the shutter closed position. Fig. 4 is a plan view of the shutter actuating means shown in Fig. 3 and shows said parts in the full open shutter position.

In the drawings 10 indicates the radiator of a motor vehicle, 11 the usual radiator shell, 12 the water cap projecting upwardly from the radiator and through said shell, 13 the hood cover, 14 the cowl positioned rearwardly of the hood and 15 the instrument board associated therewith. In the present instance the shutter actuating means is positioned upon the dash or partition wall 16 and beneath the cowl, and suitable connections extend from said cowl to the radiator and the shutters.

As shown clearly in Fig. 1, 17 illustrates a reservoir for an expansible fluid such as mercury or the like which is expansible under heat, which heat is derived from the water cooling system of the motor vehicle or the radiator thereof. Suitable flexible tubing or conduit means 18 connects said heat expansible liquid reservoir with the shutter actuating means 19 positioned upon the partition wall 16.

As shown clearly in Figs. 1 and 2 the shutter actuating means 19 includes a housing portion secured to the wall 16. Within the housing 19 is secured a compressible or collapsible wall 20, said wall being substantially circular in form, one end thereof being closed by the plate 21 and the other end by the plate 22. The plate 21 is stationary and is provided with an opening communicating with a flexible tubing 18 whereby the chamber 23 acts as a cylinder and the plate 22 acts as a piston, said plate 22 moving from the position shown in Fig. 1 to the position shown in Fig. 2 under the influence of the expansible liquid or fluid in the reservoir 17, tube 18 and chamber 23. The plate 22 is provided with a recess 24 in which is seatable a cupped plate 25 to which is secured a piston rod 26, said rod extending rearwardly and through the housing 19 and the threaded bushing 120. Concentric with the plate 25 is a washer 27 or plate, said washer being positioned adjacent the rear wall of the housing 19 and suitably connected to the bushing 120. A hexagonal nut portion 121 upon the bushing 120 adjustably secures the plate 27 within the housing. Between the washer 27 and the plate 25 is positioned a coiled compression spring 28 which tends to maintain the piston plate or wall 22 in the closed position, as illustrated in Fig. 1. When the expansible fluid expands, under the influence of the rising temperature of the cooling system, said fluid causes said plate 22 or piston member to move from the position shown in Fig. 1 to the position shown in Fig. 2 in opposition to the spring 28, thereby moving the piston rod 26 from the position shown in Fig. 1 to the position shown in Fig. 2.

The means for transmitting the reciprocating motion of the piston rod 26 to the shutter construction comprises the lever 30 pivoted intermediate its ends at 31 to the piston rod 26 and pivotally supported at one end 32 by means of a pivotally supported link 33, which link is supported at 34 upon the housing 19. The other end of the pivotally supported link 30 is secured to a reciprocating rod 35 which rod actuates the shutters through means hereinafter to be described, said rod extending through the partition 16 and being suitably supported. Associated with the actuating rod 35 is a connecting rod 36, the same being supported in the bracket 37 upon the vehicle and being connected to the rod 35 by means of the union or coupling 38. The other end of the rod 36 is secured to one end of a bell crank lever 40, said lever being pivoted at 41. The portion 40 of the bell crank lever is curved, as shown clearly in Figs. 3 and 4, so that it is adapted to be positioned adjacent the water cup 12. The other end 42 of the bell crank lever is secured to one end of the spring member 43, the other end of which is adjustably supported by means of the bolt means 44 and nut means 45 in the bracket 46. The spring member 43 normally tends to maintain the lever 40 in the position shown in Fig. 3, said lever being movable to the position shown in Fig. 4 in opposition to the tension of the spring 43 by means of the rod 35 actuated by the expansion of the expansible fluid in the chamber 23.

The means for transmitting to the shutters the rocking motion of the pivot 41, which may be in the form of a stub shaft, or said lever 40 may be otherwise connected to the lever means 47, in the present instance comprises a single lever member pivoted intermediate its ends, one end 48 of which is connected by means of the actuating rod 49 to one set of shutters, while the opposite end 50 is connected to another actuating rod 51 which is connected to another set of shutters.

In the invention illustrated the shutters 52 are pivotally supported at one edge 53 and are provided with actuating ears 54, which ears are suitably secured to an actuating bar 55, which bar is reciprocable transversely of the longitudinal axis of the motor vehicle by the means hereinbefore described associated with the rod member 47 and 51. The rod members 49 and 51 are provided with suitable stop means 56, and concentric with said rod means and bearing against the washer and stop means 56 is a tension spring 57. Temperature adjustment can also be obtained by the spring 57 since said spring has its free end bearing against a bracket 58 carried by the bar 55, while said bracket 58 is slotted to receive the free end of the rod 51 or 49 which extends therethrough and is threaded to receive the adjusting and locking ends 59.

With the foregoing construction it will be understood that after the rod 36 is moved from the position shown in Fig. 3 to the position shown in Fig. 4 the bar members 55, of which in the present instance there are two, are moved from the position shown in Fig. 3, which is the closed position, to the position shown in Fig. 4, and as shown in said figure said rods abut each other when the shutters are in the open position, thus preventing further movement of the actuating means.

The dual construction associated with the actuating means is assisted in the present instance by the pivoting of the shutters associated with the radiator shell, whereby the shutters positioned upon the right half of the shell are pivoted at one vertical edge, and the shutters which are positioned upon the left half of the shell are pivoted upon the opposite vertical edge thereby forming a symmetrical arrangement of the shutters either in the closed or open positions.

From the foregoing it will be understood that as the temperature of the cooling liquid in the radiator rises, and the temperature of the expansible fluid in the reservoir 17 also rises and said fluid expands, thereby moving the piston rod 26 from the position shown in Fig. 1 to the position shown in Fig. 2 or to a position intermediate thereof. The actuating or critical temperature is regulated by the tension of the spring 28. The piston through the pivoted lever 30 and the reciprocating rod 35 transmits said movement through the bell crank lever 40, which in turn actuates the lever means 47 to reciprocate simultaneously the shutter actuating bars 55 as hereinbefore described. The amount of actuation depends upon the amount of movement imparted to the piston rod 26 and, therefore, the degree of expansion of the fluid in the reservoir 17 and the cylinder 23.

The invention claimed is:

1. In a shutter construction, the combination with a plurality of pivotally supported shutters, and reciprocating bar means connected to each shutter for actuating the same, of means for reciprocating said bar means including a lever, link means connecting said lever to said bar means, means for adjusting the length of said link means, yielding means for maintaining said lever and shutters in the closed position, means for rocking said lever in opposition to said maintaining means to open said shutters, and means for adjusting the tension of the yielding maintaining means.

2. In a shutter construction the combination of a plurality of oppositely positioned shutters, a plurality of bar means for operating the oppositely positioned shutters, lever means associated with each bar means, a rock shaft for tilting said lever means, and rod and lever means for rocking said shaft.

3. In a shutter construction the combination of a plurality of oppositely positioned shutters, a plurality of bar means for operating the oppositely positioned shutters, lever means associated with each bar means, a rock shaft for tilting said lever means, a bell crank for rocking said shaft, a reciprocating rod for one end of the bell crank to open said shutters, and means connected to the other end of said bell crank to close said shutters.

4. In a shutter construction the combination of a plurality of oppositely positioned shutters, a plurality of bar means for operating the oppositely positioned shutters, lever means associated with each bar means, a rock shaft shaft for tilting said lever means, a bell crank for rocking said shaft, a reciprocating rod for one end of the bell crank to open said shutters, and yielding means connected to the other end of said bell crank to maintain said shutters in closed position.

In witness whereof we have hereunto affixed our signatures.

JOHN W. APPLIN.
HARVEY L. WATSON.